United States Patent [19]

Horigome et al.

[11] 4,291,100
[45] Sep. 22, 1981

[54] MAGNETIC RECORDING MEDIUM

[75] Inventors: Eiji Horigome; Hiroshi Ota; Hitoshi Azegami, all of Tokyo, Japan

[73] Assignee: TDK Electronics Co., Ltd., Tokyo, Japan

[21] Appl. No.: 161,573

[22] Filed: Jun. 20, 1980

[30] Foreign Application Priority Data

Jun. 23, 1979 [JP] Japan ................................ 54/79296

[51] Int. Cl.³ ........................................... H01F 10/02
[52] U.S. Cl. ............................. 428/424.2; 252/62.54; 360/131; 360/134; 427/128; 428/424.4; 428/424.6; 428/518; 428/522; 428/900
[58] Field of Search .................... 252/62.54; 427/128; 360/134, 135, 136, 131; 428/900, 424.1, 424.2, 424.4, 424.6, 518, 522, 539

[56] References Cited

U.S. PATENT DOCUMENTS

| | | | |
|---|---|---|---|
| 3,029,157 | 4/1962 | Sutheim et al. | 252/62.54 |
| 3,630,772 | 12/1971 | Seidel | 428/425.9 |
| 3,649,541 | 3/1972 | Ingersoll | 428/425.9 |
| 4,049,566 | 9/1977 | Brilovich et al. | 252/62.54 |
| 4,107,385 | 8/1978 | Higuchi et al. | 428/425.9 |
| 4,152,484 | 5/1979 | Bachmann et al. | 428/425.9 |
| 4,187,345 | 2/1980 | Yamaguchi et al. | 428/539 |

FOREIGN PATENT DOCUMENTS

| | | | |
|---|---|---|---|
| 51-39081 | 10/1976 | Japan | 427/128 |
| 54-29243 | 9/1979 | Japan | 428/900 |
| 54-147815 | 11/1979 | Japan | 428/900 |
| 54-47816 | 11/1979 | Japan | 428/900 |

Primary Examiner—Stanley S. Silverman
Attorney, Agent, or Firm—Oblon, Fisher, Spivak, McClelland & Maier

[57] ABSTRACT

A magnetic recording medium comprises a substrate coated with a magnetic layer wherein a magnetic powder is orientated in a binder and a polyoxyethylenesorbitane higher fatty acid ester surfactant.

6 Claims, 2 Drawing Figures

MAGNETIC RECORDING MEDIUM

BACKGROUND OF THE INVENTION

1. Field of the Invention:

The present invention relates to an improvement of a magnetic recording medium such as a magnetic tape and a flexible disc. More particularly, it relates to a magnetic recording medium which has low coefficient of friction and small adhesion of a magnetic powder on a head of a recorder.

2. Description of the Prior Arts:

The magnetic recording medium is usually obtained by coating a magnetic powder composition as a mixture of a magnetic powder and a binder such as polymers on a substrate made of a polymer such as polyester. In the conventional magnetic recording medium, the magnetic powder is peeled off by friction resistance between the magnetic powder membrane and a head of a recorder so as to adhere the magnetic powder on a head of a recorder whereby reproduction characteristics in high tone region are deteriorated. In order to overcome such disadvantages, a lubricant is incorporated into a magnetic powder composition so as to increase the effect of lubrication of the magnetic powder composition and to decrease a friction resistance between the magnetic powder membrane and the head of the recorder. The effect of lubrication of the incorporation of the conventional lubricant at a low temperature is unsatisfactorily low. It has been required to improve such characteristics for a magnetic recording medium used at a low temperature in winter such as a magnetic tape used for a car stereo recorder.

SUMMARY OF THE INVENTION

It is an object of the present invention to provide a magnetic recording medium which can be smoothly run in highly stable condition even at a low temperature under remarkably reducing the adhesion of the magnetic powder on the head of the recorder.

The foregoing and other objects of the present invention have been attained by providing a magnetic recording medium which comprises a substrate coated with a magnetic layer wherein a magnetic powder is orientated in a binder and a polyoxyethylenesorbitane higher fatty acid ester surfactant.

Figure 1:
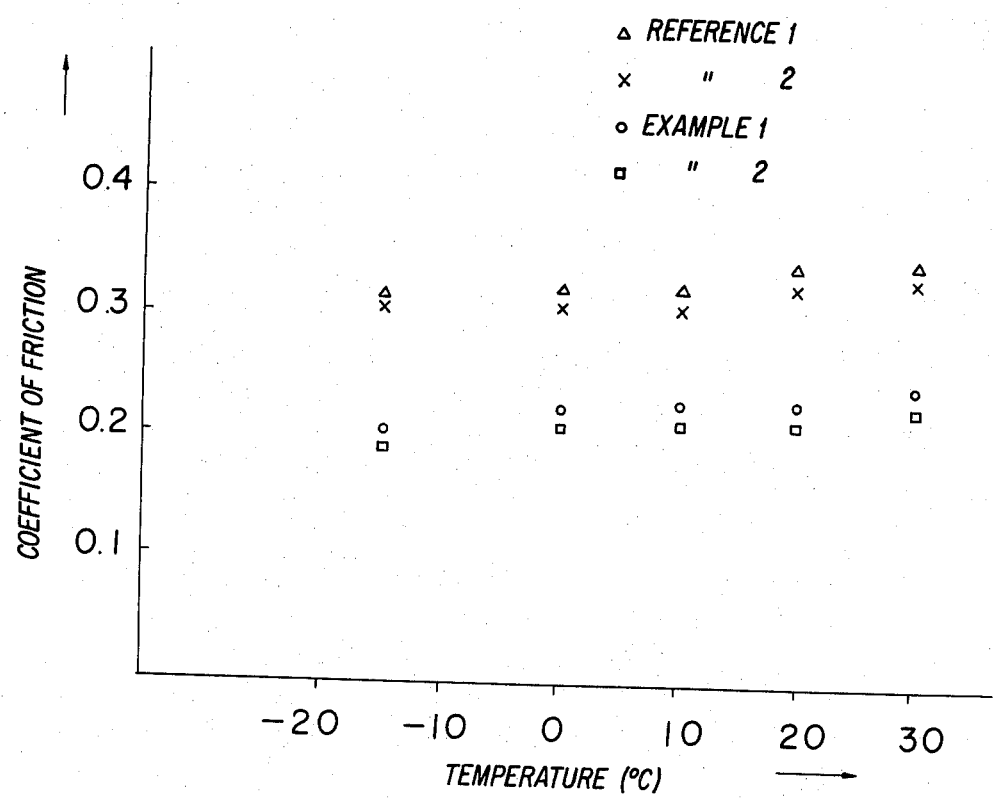
FIG. 1 shows coefficiences of friction of magnetic tapes prepared by using the magnetic powder compositions of Examples 1 and 2 and References 1 and 2 at various temperatures.

DETAILED DESCRIPTION OF THE PREFERRED EMBODIMENTS:

The polyoxyethylenesorbitane higher fatty acid esters used in the present invention are condensates of ethyleneoxide

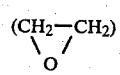

and a sorbitane higher fatty acid ester. It is preferable to use such polyoxyethylenesorbitane higher fatty acid esters which have hydrophilic property to be water soluble and especially have HLB of 7 to 18.

The polyoxyethylenesorbitane higher fatty acid ester is usually incorporated at a ratio of 1 to 30 wt.% preferably 2 to 20 wt.% based on a total of the binder.

The binder can be the conventional binder for the magnetic powder composition coated on the substrate of the magnetic recording medium.

Suitable binders include the conventional binders such as polyurethane, nitrocellulose and copolymers of vinyl chloride-vinyl acetate and/or vinyl alcohol and the other thermoplastic or thermosettable resins. The magnetic powders can be the conventional magnetic powders. These binders and magnetic powders are described in detail in the prior patent applications and accordingly, the description of the binders and the magnetic powders is not repeated.

The following prior patents and applications are referred as the descriptions of the binders and the magnetic powders. U.S. Pat. No. 4,115,290, G.B. Patent Publications Nos. 2,017,117A, 2,021,126A and Patent Applications U.S. Ser. No. 109,032, West German Pat. No. 3,001,451, U.K. Pat. No. 8001322 and Netherland Pat. No. 800061 and Japanese Patent Application No. 79937/1979.

The polyoxyethylenesorbitane higher fatty acid ester surfactant can be incorporated in a preparation of the resin solution or in a mixing of the magnetic powder or after a preparation of the magnetic powder composition though it is usually incorporated with the binder.

The present invention will be further illustrated by certain examples and references which are provided for purposes of illustration only and are not intended to be limiting the present invention.

The following magnetic powder and solvent were commonly used in both of examples and references.

| Magnetic Powder: | |
|---|---|
| $\gamma$-Fe$_2$O$_3$: | 100 wt. parts |
| Solvent: | |
| Methyl ethyl ketone: | 100 wt. parts |
| Methyl isobutyl ketone: | 100 wt. parts |
| Toluene: | 100 wt. parts |

The following binders were respectively incorporated in the mixture of the magnetic powder and the solvent. A is a binder of vinyl chloride-vinyl acetate copolymer; B is a binder of polyurethane resin; and C is polyoxyethylenesorbitane higher fatty acid ester surfactant. In the references and examples, the following kinds of the binders and the surfactants were used together with the above-mentioned magnetic powder and solvent. Only the binder and the surfactant added to said magnetic powder and the solvent are stated.

| REFERENCE 1: | |
|---|---|
| A: vinyl chloride-vinyl acetate copolymer: (VAGH manufactured by UCC) | 23 wt. parts |
| B: polyurethane: (Nippolan 5033 manufactured by Nippon Polyurethane Co.) | 10 wt. parts |

| | |
|---|---|
| A: vinyl chloride-vinyl acetate-vinyl alcohol: | 26 wt. parts |

| | |
|---|---|
| copolymer (10% vinyl alcohol component) | |
| B: polyurethane: | 7 wt. parts |
| (Estane 5703 manufactured by B.F. Goodrich Co.) | |

EXAMPLE 1

The same kinds and amounts of components A and B of Reference 1 were used together with the following surfactant.

| | |
|---|---|
| C: polyoxyethylenesorbitane trioleate: | 2 wt. parts |
| (Sorbon T-85 manufactured by Toho Kagaku Kogyo K.K.) | |

EXAMPLE 2

The same kinds and amounts of components A and B of Reference 2 were used together with the following surfactant.

| | |
|---|---|
| C: polyoxyethylenesorbitane tristearate: | 2 wt. parts |
| (Tween 65 manufactured by Kao-Atlas Co.) | |

EXAMPLE 3

| | |
|---|---|
| A: vinyl chloride-vinyl acetate copolymer: | 23 wt. parts |
| (S-LECA manufactured by Sekisui Kagaku Kogyo K.K.) | |
| B: polyurethane: | 10 wt. parts |
| (Estane 5715 manufactured by B.F. Goodrich Co.) | |
| C: polyoxyethylenesorbitane monooleate: | 2 wt. parts |
| (Tween 80 manufactured by Kao-Atlas Co.) | |

EXAMPLE 4

| | |
|---|---|
| A: vinyl chloride-vinyl acetate copolymer: | 26 wt. parts |
| (VAGH manufactured by UCC) | |
| B: polyurethane: | 7 wt. parts |
| (Nippolan 5032 manufactured by Nippon Polyurethane Co.) | |
| C: polyoxyethylenesorbitane monopalmitate: | 2 wt. parts |
| (Tween 40 manufactured by Kao-Atlas Co.) | |

In each preparation of each magnetic tape, the binder and the surfactant were incorporated into the magnetic powder and the solvent as stated in the references and the examples, the mixture was thoroughly mixed to disperse in a ball mill and the mixture was coated on a polyester film having a thickness of 12μ and dried to give a thickness of the membrane of 6μ and the surface of the coated film was processed and the film was cut to obtain each magnetic tape.

Coefficients of friction of the magnetic tapes obtained in References 1 and 2 and Examples 1 and 2 were measured in a temperature range of −20° to 30° C. The results are shown in FIG. 1.

As it is clearly found in FIG. 1, the coefficients of friction in Examples 1 and 2 were remarkably lower than those of References 1 and 2. The coefficients of friction of the examples were lower depending upon the decrease of the temperature. In accordance with the present invention, the coefficients of friction at the low temperature region are remarkably lower than those of the conventional ones. At the low temperature region, excellent lubrication effect is shown. Although the data are not shown in FIG. 1, the coefficients of friction in Examples 3 and 4 were substantially the same. Adhesions of the magnetic powder on a head by using the magnetic tapes obtained in References 1 and 2 and Examples 1 and 2 were measured in a temperature range of −20° to 30° C. The results are shown in FIG. 2.

In the tests, a car stereo tape recorder was used and the magnetic tapes were respectively, continuously runned for 100 hours. The amount of the magnetic powder (mg) peeled off from the magnetic membrane which was adhered on the head at each temperature was measured.

Figure 2:
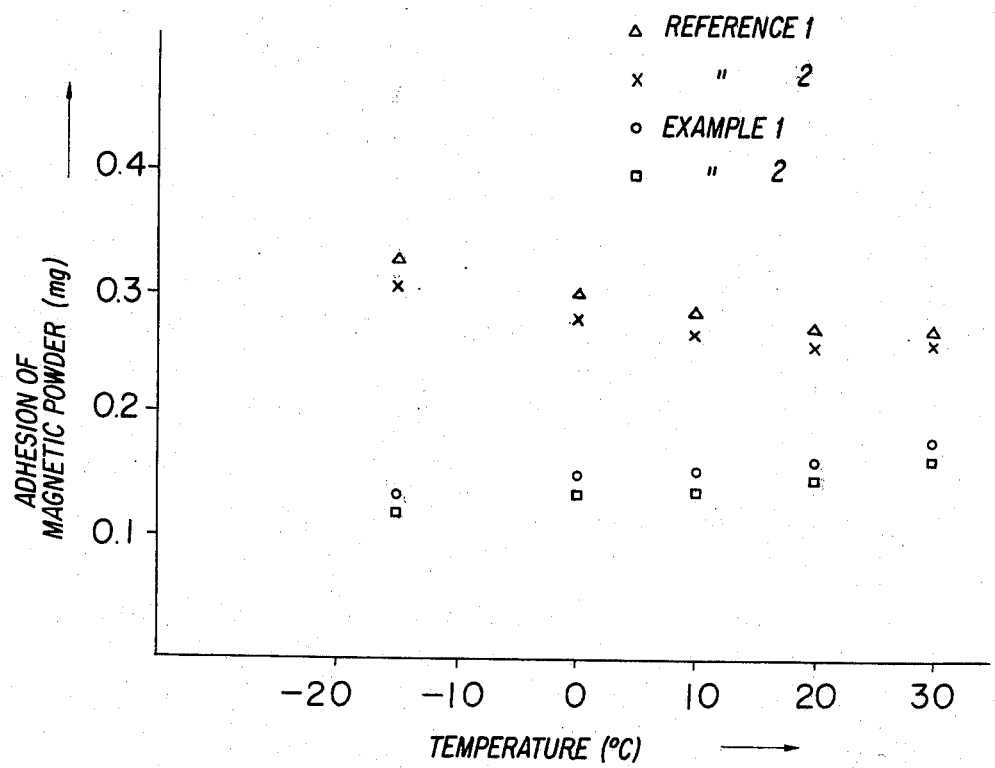
FIG. 2 shows adhesions of the magnetic powder after running magnetic tapes prepared by using the magnetic powder compositions of Examples 1 and 2 and References 1 and 2 at various temperature.

As it is clearly found in FIG. 2, the adhesions of the magnetic powder in Examples 1 and 2 were remarkably smaller than those of References 1 and 2. The adhesions of the magnetic powder at the low temperature region are remarkably lower than those of the conventional ones. Therefore, the magnetic tape of the present invention is especially preferable to use it at a low temperature ambient in view of the low coefficient of friction and the small adhesion of the magnetic powder at the low temperature region.

Although the data are not shown in FIG. 2, the adhesions of the magnetic powder in Examples 3 and 4 were substantially the same.

In accordance with the preparation of the magnetic recording medium of the present invention, a polyoxyethylenesorbitane higher fatty acid ester surfactant is incorporated in the magnetic powder composition and the composition is coated on a substrate, whereby a stability in running at a low temperature is remarkably high and an adhesion of the magnetic powder on a head is small. Therefore, the magnetic recording medium having high quality and high reliability can be obtained.

We claim

1. A magnetic recording medium which comprises a substrate coated with a magnetic layer wherein a magnetic powder is orientated in a binder and a polyoxyethylenesorbitane higher fatty acid ester surfactant.

2. The magnetic recording medium according to claim 1 wherein said polyoxyethylenesorbitane higher fatty acid ester surfactant has hydrophilic property to be water soluble.

3. The magnetic recording medium according to claim 1 or 2 wherein said polyoxyethylenesorbitane higher fatty acid ester surfactant has HLB of 7 to 18.

4. The magnetic recording medium according to claim 1 or 2 wherein said binder is a mixture of a copolymer of vinyl chloride-vinyl acetate and/or vinyl alcohol and a polyurethane with or without a crosslinking agent.

5. The magnetic recording medium according to claim 1 or 2 said polyoxyethylenesorbitane higher fatty acid ester is incorporated at a ratio of 1 to 30 wt. percent preferably 2 to 20 wt. percent based on a total of said binder.

6. The magnetic recording medium according to claim 1 or 2 wherein said binder is cured with a curing agent.

* * * * *